US006674037B2

(12) United States Patent
Ruigrok et al.

(10) Patent No.: US 6,674,037 B2
(45) Date of Patent: Jan. 6, 2004

(54) APPARATUS AND METHOD FOR TRANSPORTING AND SORTING FLOWERS

(75) Inventors: Albertus Johannes Ruigrok, Pijnacker (NL); Johannes Cornelis J. Tas, Nootdorp (NL)

(73) Assignee: FPS Food Processing Systems B.V. (NL)

( * ) Notice: Subject to any disclaimer, the term of this patent is extended or adjusted under 35 U.S.C. 154(b) by 0 days.

(21) Appl. No.: 09/983,593

(22) Filed: Oct. 25, 2001

(65) Prior Publication Data

US 2002/0056670 A1 May 16, 2002

(30) Foreign Application Priority Data

Oct. 25, 2000 (EP) .............................................. 00203690

(51) Int. Cl.[7] ................................................. B07C 5/34
(52) U.S. Cl. ....................... 209/577; 290/617; 290/587; 290/592; 198/370.03; 198/803.7
(58) Field of Search ................................. 209/577, 617, 209/587, 592, 645, 640, 646; 198/370.03, 477.01, 803.14, 803.7

(56) References Cited

U.S. PATENT DOCUMENTS

| | | | | | |
|---|---|---|---|---|---|
| 2,682,288 A | * | 6/1954 | Magnuson et al. | ............ | 100/6 |
| 3,401,796 A | * | 9/1968 | Hagiz | ......................... | 209/560 |
| 3,517,809 A | * | 6/1970 | Gregoire | ..................... | 209/546 |
| 3,598,234 A | * | 8/1971 | Gregoire et al. | .............. | 209/43 |
| 3,645,394 A | * | 2/1972 | Goodale | ...................... | 209/605 |
| 3,659,709 A | * | 5/1972 | Bartlett et al. | ............... | 209/551 |
| 3,743,092 A | * | 7/1973 | Levinstein | ................... | 209/586 |
| 4,412,620 A | * | 11/1983 | Altenpohl et al. | ............ | 209/3.1 |
| 4,601,156 A | * | 7/1986 | Parry et al. | .................... | 53/399 |
| 4,704,846 A | * | 11/1987 | Lev et al. | ...................... | 53/522 |
| 5,157,899 A | * | 10/1992 | Tas | .............................. | 53/399 |
| 6,460,315 B1 | * | 10/2002 | Craig et al. | .................... | 53/399 |

FOREIGN PATENT DOCUMENTS

| EP | 0 449 386 | 10/1991 |
|---|---|---|
| EP | 0 672 341 | 9/1995 |

* cited by examiner

Primary Examiner—Donald P. Walsh
Assistant Examiner—Jonathan R. Miller
(74) Attorney, Agent, or Firm—Larson & Taylor, PLC

(57) ABSTRACT

A method and apparatus for transporting and sorting flowers or other stem-shaped or elongate products with a conveyor provided with arm-fork units which are moved along a transport path in a substantially horizontal plane. In one form, the method includes taking over a substantially vertically hanging flower from a take-over position with a fork at the end of the arm-fork unit remote from the conveyor. The flowers are transported along the transport path, with the arm-fork unit in a transport position, to an apparatus for bunching the transported flowers with generally several bunching stations. The transporting takes place in the plane along at least one detector for detecting at least one respective flower characteristic, whereby detection signals are obtained. The detection signals are processed in a processing unit into corresponding selection signals. The arm-fork units are controlled using the selection signals for delivering the flower to a corresponding selected bunching station, whereby the arm-fork unit in the horizontal plane is brought to a delivery position by moving the arm-fork unit, during movement along the transport path, over some distance away from the conveyor out of the transport position to subsequently deliver the flower from the fork to the selected bunching station, while for assuming the delivery position, the fork is rotated relative to the transport position to a delivery position.

19 Claims, 5 Drawing Sheets

APPARATUS AND METHOD FOR TRANSPORTING AND SORTING FLOWERS

Figure 1:
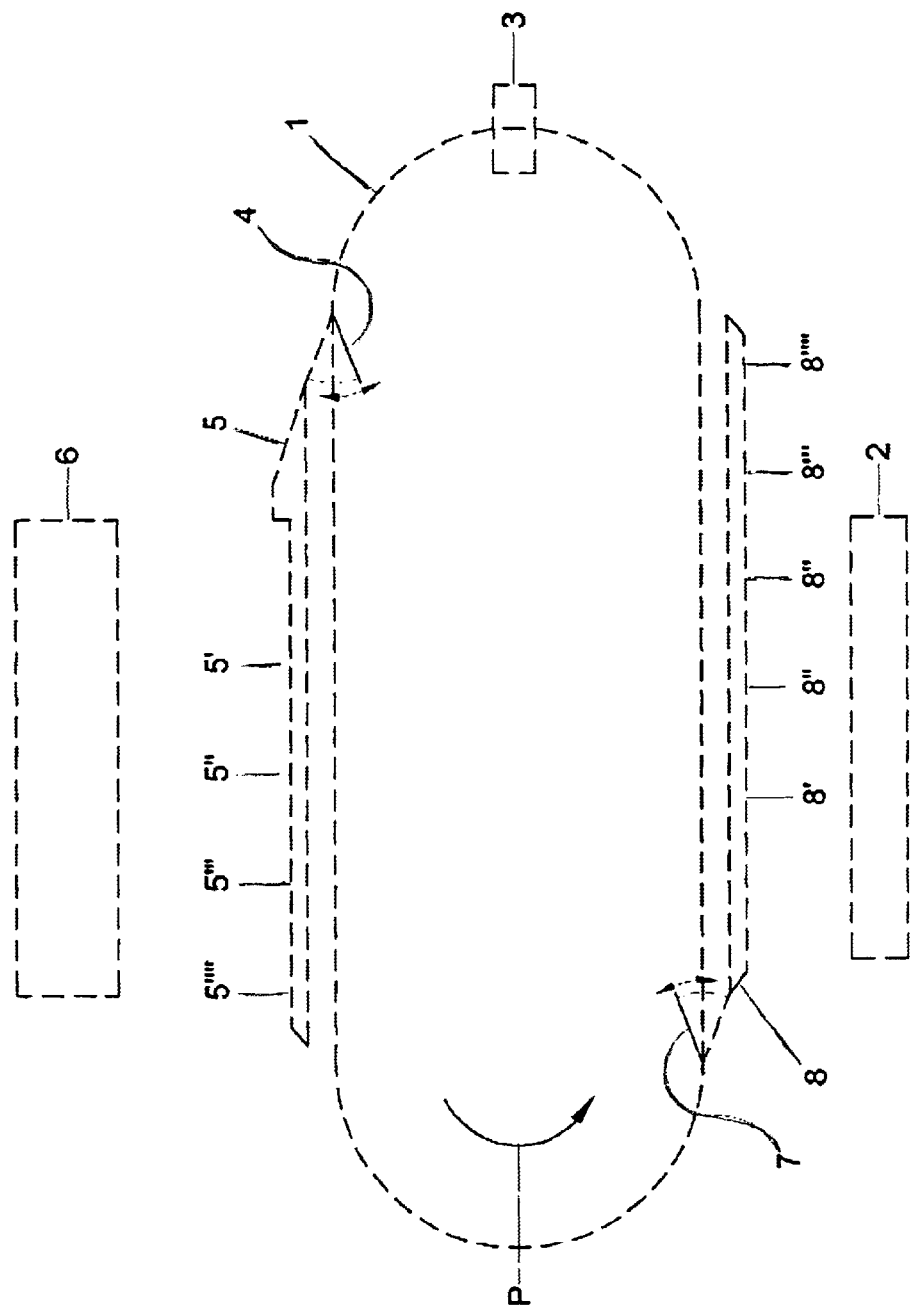

The present invention relates to a method and apparatus for transporting and sorting flowers or other stem-shaped or elongate products, with a conveyor provided with arm-fork units which are moved along a transport path in a substantially horizontal plane.

In particular, such a method comprises:

taking over a substantially vertically hanging flower from a take-over position with a fork at the end of the arm-fork unit remote from the conveyor, transporting the flowers, along the transport path and with the arm-fork unit in a transport position, to an apparatus for bunching the transported flowers with generally several bunching stations, the transport taking place in said plane along at least one detector for detecting at least one flower characteristic, whereby detection signals are obtained, processing the detection signals in a processing unit into corresponding selection signals, controlling the arm-fork units with the selection signals for delivering the flower to a corresponding selected bunching station, whereby the arm-fork unit is brought in the horizontal plane to a delivery position by moving the arm-fork unit, during movement along the transport path, over some distance away from the conveyor out of the transport position to subsequently deliver the flower from the fork to the selected bunching station.

Such an apparatus comprises, in particular:

detection elements for detecting at least one flower-characteristic during the transport of the flowers to an apparatus for bunching the transported flowers with generally several bunching stations, whereby detection signals are obtained, a processing unit for processing the detection signals into corresponding selection signals, control elements for bringing, in response to the selection signals, the arm-fork units into a delivery position for delivering the flower at a delivery position to a corresponding selected bunching station, the arm-fork unit being movable in said horizontal plane from a transport position over some distance away from the conveyor to the delivery position.

Apparatuses of that type are known from, for instance, U.S. Pat. Nos. 5,157,899 and 3,659,709. Both documents show a series of arm-fork units, mounted on a chain of an endless conveyor which circulates in a horizontal plane. The units are so constructed that in that plane at defined positions flowers can be hung into forks and at other well-defined positions these flowers can be delivered and can be gathered into bunches to be bundled. According to U.S. Pat. No. 5,157,899 the forks are located in line with an arm extendable in a direction perpendicular to the conveyor. In U.S. Pat. No. 3,659,709, forks with arms in the form of a parallelogram construction are pivoted away from and back to the chain of the conveyor, while the forks, as in U.S. Pat. No. 5,157,899, maintain a position perpendicular to the chain.

In both apparatuses, the flexibility is lacking in taking over and delivering fragile products such as flowers, for instance roses, because the fork, in particular the direction of the fork pins, is always fixed perpendicular to the transport direction.

U.S. Pat. No. 5,157,899 exhibits the disadvantage that for large flowers the mutual distance between the arm-fork units in many cases proves to be too small, so that flowers aet entangled with each other.

U.S. Pat. No. 3,659,709, by contrast, has the disadvantage that although sufficient space has been created to separate the flowers from each other during transport, the use of a parallelogram construction, which defines both the intermediate distance along the conveyor as well as the perpendicular distance from the conveyor, renders this intermediate distance very large, so that the number of products that can be transported per unit length is limited considerably.

To remedy these shortcomings, in accordance with the invention, the method according to the prior art represented above is characterized in that for assuming the delivery position the fork is rotated relative to the transport position to a delivery position.

The apparatus according to the invention is characterized in that the arm-fork units, at the remote ends, have rotation elements to rotate the fork relative to the transport position to a rotation end angle which corresponds with the delivery position.

This method and apparatus not only have the advantage that they are space-saving, but also that the number of rotary parts of the arm-fork unit is limited. A further considerable advantage is achieved through the basically adjustable rotation and the associated rotation end angle. These measures enable a flexible positioning of supply and discharge devices.

In a further elaboration, the method is characterized in that the fork is rotated in the horizontal plane, while the delivery position of the fork is in line with the arm, perpendicular to the transport direction, and more in particular, the fork is rotated through an angle of at most −180° relative to the transport direction.

A next embodiment of the method according to the present invention is characterized in that for taking over the flower the fork is rotated relative to the transport position to a take-over position, more in particular, that the fork is rotated in the horizontal plane, while in a preferred embodiment the fork is rotated through an angle of at most −180° relative to the transport direction, and in the horizontal plane the fork is brought to the take-over position while the arm-fork unit, during movement along the transport path, is moved over some distance away from the conveyor to subsequently take over the flower from the take-over position.

In a still further embodiment, the method according to the present invention is characterized in that the flowers are embraced between substantially the take-over position and the delivery position.

The great advantage of this is that at take-over the flowers are immediately embraced without getting entangled with flowers hanging next to them, and moreover that swerving out and possible entanglement during transport are prevented entirely.

According to a further embodiment, the apparatus according to the present invention is characterized in that the rotation elements perform a rotation to the rotation end angle in the horizontal plane, whereby the fork, against a restraining force, is brought in line with the arm-fork unit, perpendicular to the transport direction.

In a further exemplary embodiment, the apparatus according to the present invention is characterized in that the rotation elements in the remote end of the arm-fork unit comprise a fork with shaft-hole assembly, a rotation limiting system for limiting the rotation as far as the end angle, as well as a non-elastic drive belt, while the arm-fork unit is mounted so as to be slidable transversely to the conveyor, on a sliding block mounted on the conveyor and moving along therewith, with a vertical downwardly directed rod in the proximal end of the arm-fork unit, and a guide roller on the sliding block on one side of the unit, while the drive belt is connected by one end thereof with the lower end of the rod and extends over the guide roller and then under engaging friction around the fork shaft on the other side of the unit to the proximal end of the unit and is elastically connected therewith, more particularly, the drive belt is connected with a draw spring to the proximal end of the arm-fork unit, while as a further feature, the control elements comprise > a curve plate, fixedly arranged along the conveyor, and on each arm-fork unit a curve follower, which, as soon as it butts against the curve plate upon advancement of the conveyor along the transport path, follows the curve plate, and gradually moves the arm-fork unit from its transport position away from the conveyor, and while in a further suitable manner the drive belt is connected with the lower end of the rod by means of a slide bearing, while a compression spring extends between the slide bearing and the arm-fork unit, while the compression spring is only compressed between the reaching of the rotation end angle and the delivery position, and the compression spring relaxes upon sliding back of the arm-fork unit following a step-shaped recess in the curve plate to a parking position, whereafter the arm-fork unit is gradually returned along a return sector to its transport position.

Such an apparatus with resilient drive prevents in a suitable manner a rigid positioning of the forks. Small deviations, for instance due to curved or stiff flower stems, can be accommodated in an advantageous manner.

In a further elaboration, the apparatus further comprises a monitoring element for monitoring the offer of new flowers to be taken over by the arm-fork unit, collected in a presenting element, and a second curve plate for bringing the arm-fork unit into a take-over position in response to a signal delivered by the monitoring element, while the flowers in a take-over position are taken over by the arm-fork unit from the presenting element, the presenting element being a fork, and more particularly the arm-fork units have a projection to lock the units in the delivery position with a catch connected with the conveyor.

The apparatus according to the invention is further characterized in that the apparatus further comprises clamping elements for embracing the flowers to be transported, between substantially the take-over position and the delivery position, and more particularly, that the clamping elements comprise two hinging fork pins, while the fork pins axe mounted in curve follower blocks for following a first clamping curve plate after taking over the flower and a second curve plate after delivering the flower.

Figure 2:
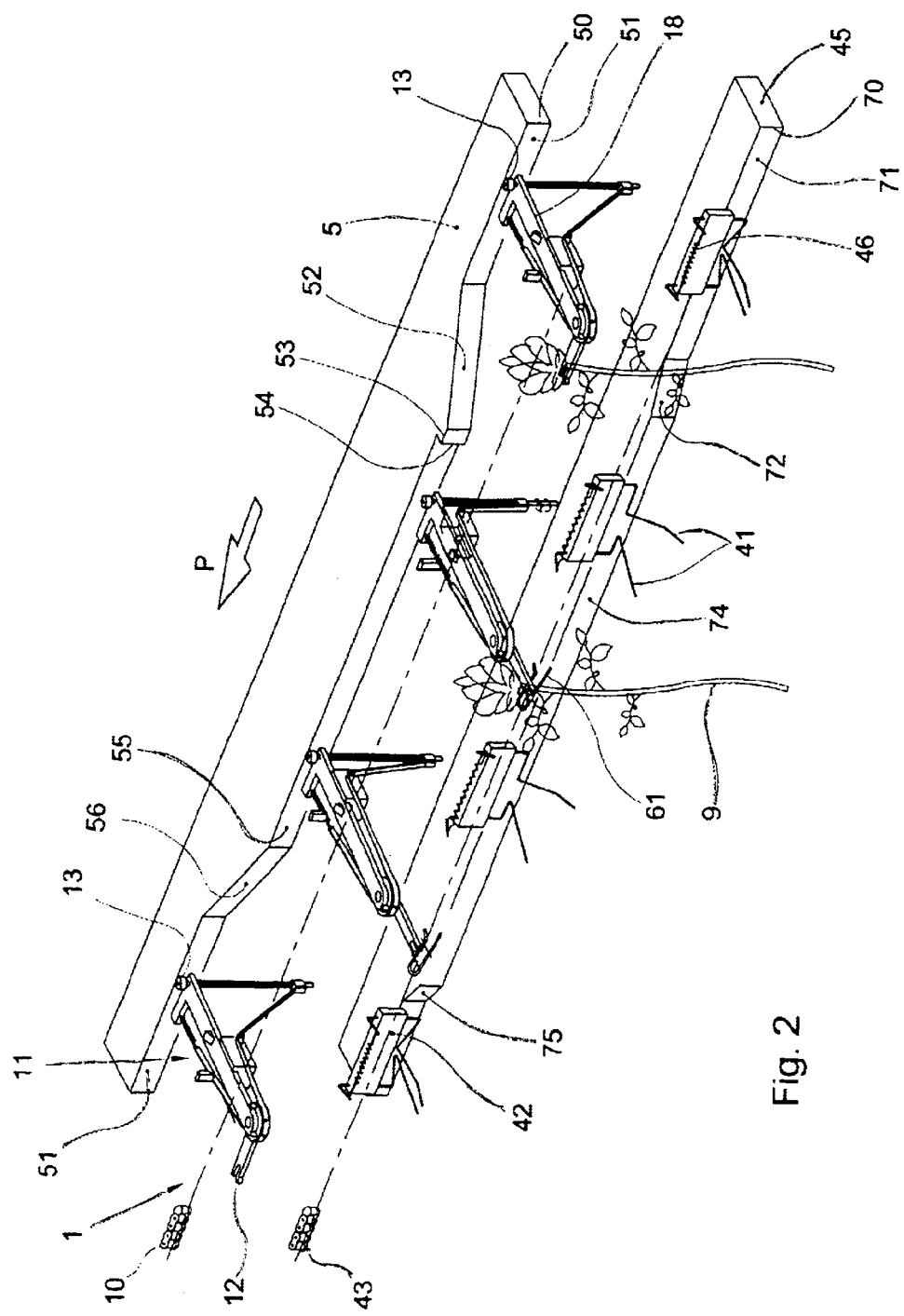
Figure 3:
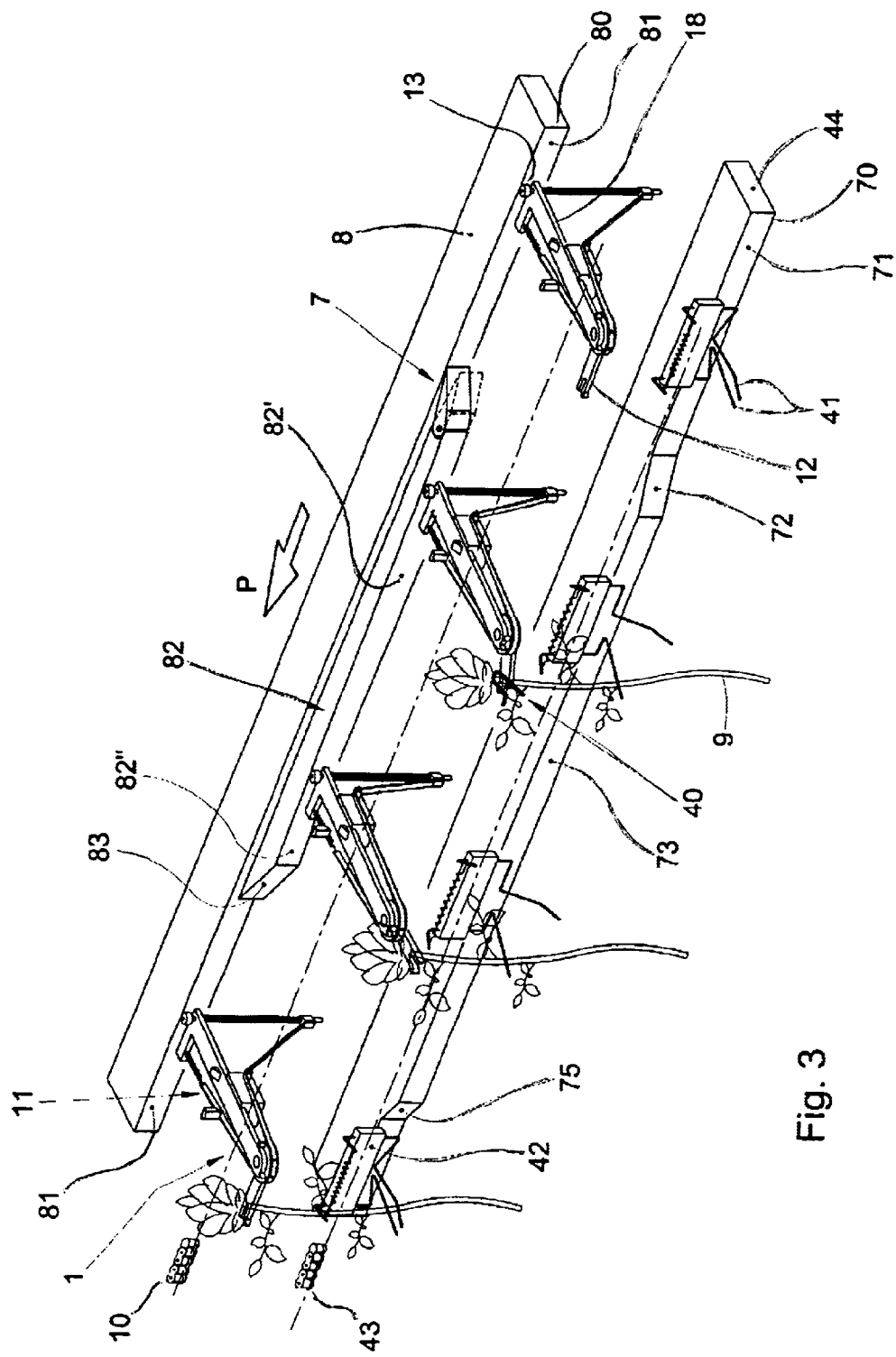
Figure 4:
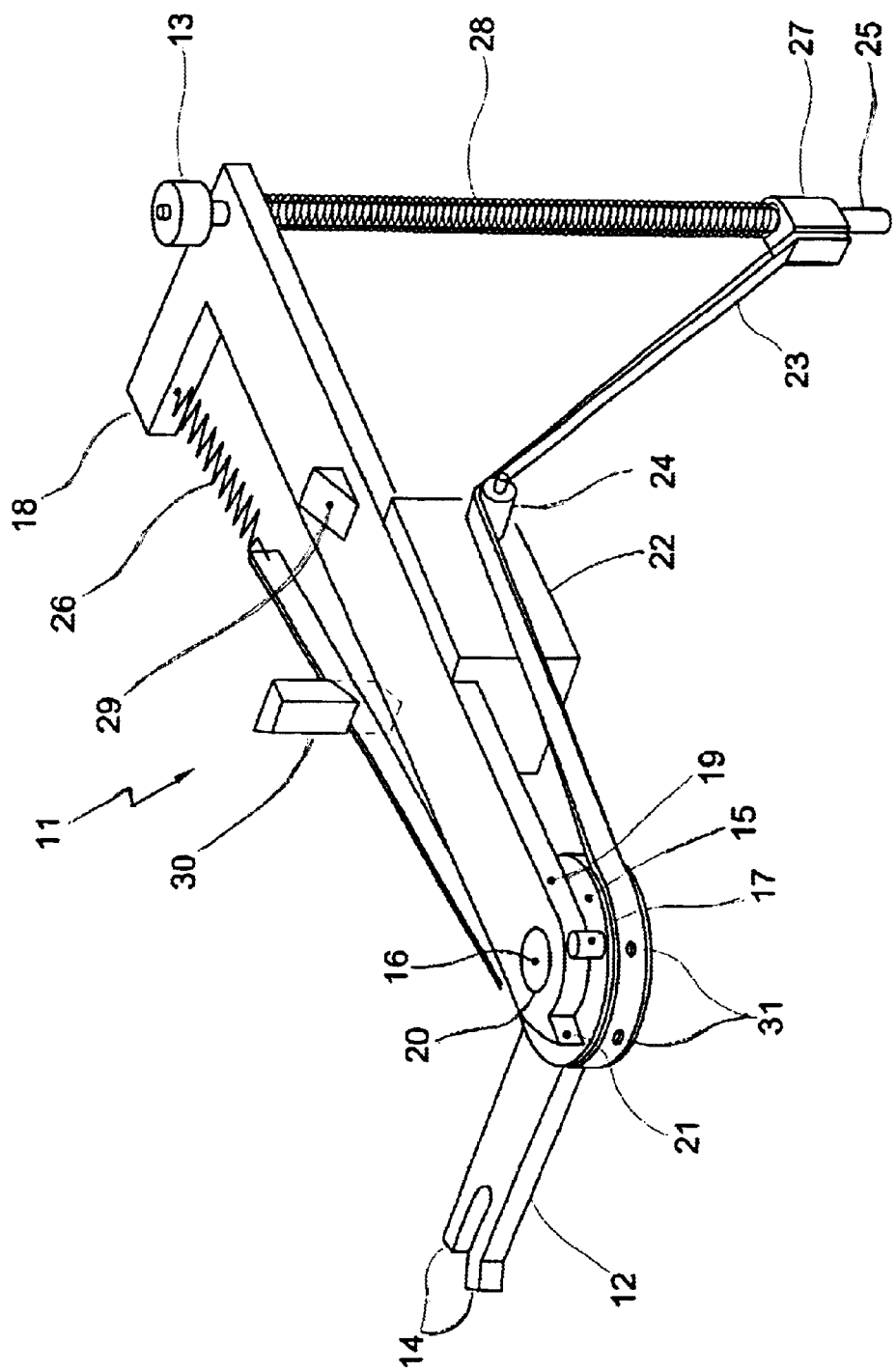
Figure 5A:
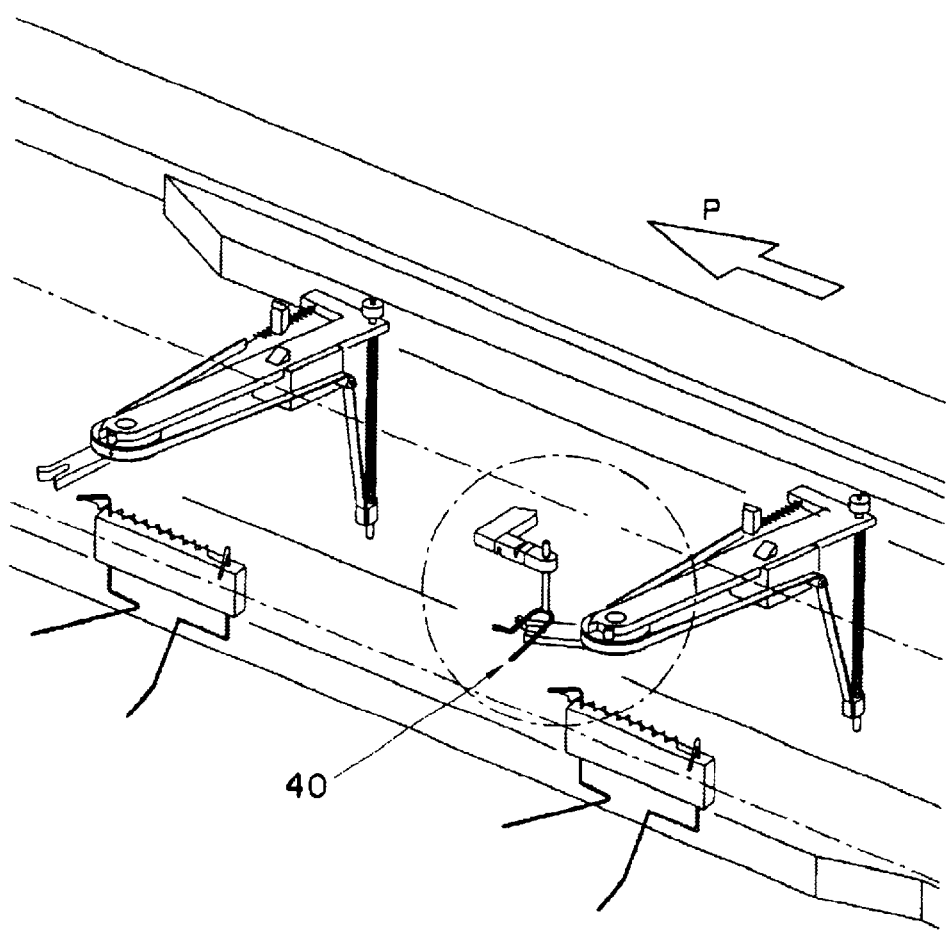
Figure 5B:
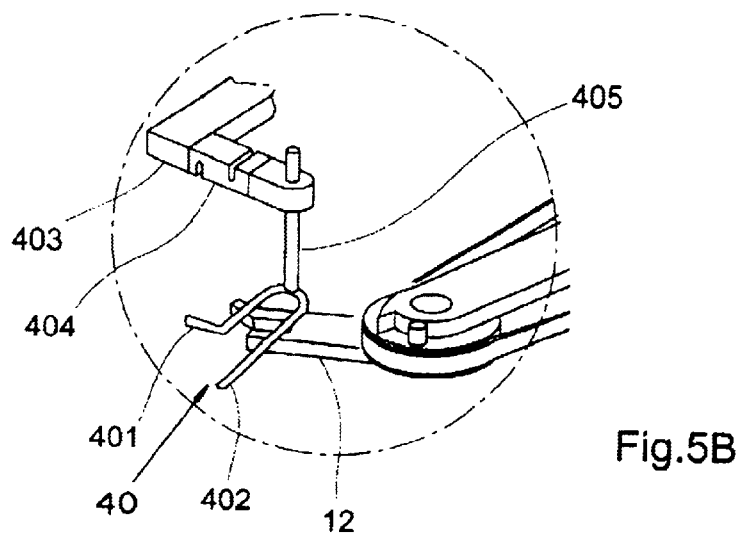

The method and apparatus according to the invention will be elucidated with reference to the accompanying drawing, wherein FIG. 1 shows an outline diagram of the apparatus according to the invention, FIG. 2 shows a view of the apparatus with details of arm-fork units when delivering flowers, FIG. 3 shows a view of the apparatus with details of arm-fork units when taking over flowers before being transported further, and FIG. 4 gives a detailed view of an arm-fork unit according to the present invention, and FIG. 5, in particular view 5A, which is a portion of FIG. 3, while view 5B is an enlarged detail of FIG. 5A, shows a presenting element according to a further embodiment of the invention.

In all figures the same parts have the same reference numerals.

In FIG. 1 there is shown an outline diagram of an apparatus for transporting and sorting flowers or other stem-shaped or elongate products. A conveyor 1 circulating along an endless path takes over products from take-over positions adjacent a supply means 2, follows a transport path in the direction of arrow P and delivers products at delivery positions adjacent bunching stations 6 where the flowers can be bundled.

Determining characteristics of the products to thereby classify the products and to be able to subsequently sort them occurs at detector 3. This is, for instance, a detector for determining the length of the flowers, or for determining the color of the flowers. The signals obtained with the detector or detectors are processed in a processing unit (not shown), in which selection signals are obtained which actuate control elements 4, such as, for instance, a first switch, as a result of which arm-fork units, intended to transport flowers and to be discussed hereinafter with reference to FIGS. 2, 3 and 4, are passed along a first curve plate 5, with repetitive delivery stations 5', 5", 5'", 5"", where the flowers are delivered in well-defined delivery positions.

In a manner comparable with the first curve plate 5, in response to a signal coming from a monitoring element not shown, such as, for instance, a photocell unit, a second switch 7 is controlled adjacent the supply means 2, so that the arm-fork units are passed along a second curve plate 8, with repetitive take-over stations 8', 8", 8'", 8"", where the flowers are taken over at well-defined positions.

FIG. 2 shows in an isometric view a part of the apparatus of the invention when delivering the flowers to a bunching station.

For the conveyor 1 there is now shown a part of an endless chain 10 which circulates arm-fork units 11, mounted at fixed intermediate distances, with forks 12 at the end of extendable and retractable main arms 18 for conveying products such as roses 9. These units 11 are mounted, for instance, on a block or plate (not shown in FIG. 2) which itself is fixedly connected with the chain, so that particular parts of these units 11 can move relative to that plate or that block. For the different parts of the units, reference is made to FIG. 4, which will be elucidated hereinafter.

In detail, it is represented how the units 11 adjacent the bunching stations 6—not further indicated—are passed in the direction of arrow P along a first curve plate 5 with butting edge 50 to deliver roses. To that end, these units 11 are passed along sectors 51–56 of the curve plate 5, thereby brought into a delivery position, to subsequently deliver the roses at a well-defined delivery position to a bunching station, in particular a delivery fork 61 thereof After a flower, such as the rose 9 drawn, has been taken over to be red along, the transport path schematically indicated in FIG. 1 is followed. As soon as a signal for the delivery of the product has been delivered, a unit 11 is passed along a curve plate 5, whereby the unit 11, through a curve follower 13, for instance a rotatable wheel, butts against the abutting edge 51. Thereupon, there are traversed, in succession: a transport sector 51 with the fork 12 in a transport position; a performing sector 52 where both the main arm 18 is moved away from the conveyor and the fork 12 is rotated, whereby a delivery position is assumed; a delivery sector 53 with the fork in its delivery position, where the fork 12 and the delivery fork 61 are passed along each other, so that the rose remains behind in the delivery fork 61; a step sector 54 for rapidly retracting just the arm without rotation of the fork 12, so that the flower without further pushing or pulling by the fork 12 remains suspended in the delivery fork 61; a parking sector 55 which is reached after the abrupt stepped retraction; and finally a return sector 56 where both the arm 18 is retracted and the fork rotates back to its transport position which is reached in a last section of transport sector 51 of the curve plate 5. FIG. 2 shows a single plate 5 for a corresponding bunching station 6, as schematically drawn in FIG. 1. In accordance with FIG. 1, for the different selections or sorting operations, several delivery stations 5', 5", . . . , will be arranged which are equipped with similar plates 5.

It is further indicated in FIG. 2 how the roses are clamped while they are supplied to the delivery fork 61. Clamping elements 41, here drawn as movable pins of a fork, embrace the flowers 9. These pins can be moved apart against the force of a tension spring 46 for the purpose of delivery, or be closed again after take-over (to be discussed with reference to FIG. 3), or after delivery. The fork pins are mounted in curve follower blocks 42, such that when these blocks arrive at a supply means 2 (see FIG. 1) or at a bunching station 6 (see FIG. 1), they are likewise passed along a curve plate, viz. a second curve plate 45 at a bunching station in the same path along the transport path as the curve plate 5 drawn, while the blocks 42, with intermediate distances equal to those of the units 11, are connected with a second chain 43, which runs synchronously and parallel to the main chain 10 of the conveyor 1. This curve plate 45 likewise has a butting edge 70 with sectors 71, 72, 74, 75. There are shown, in succession, a transport sector 71, an opening sector 72, a delivery sector 74, and a closing sector 75, in turn followed by a second section of transport sector 71. Upon butting against this plate 45, a connecting block connected with the pins is moved such that the pins are moved apart, against the spring force mentioned, and remain apart until they reach the closing sector. Such a construction has the great advantage that the flowers hang well-positioned in the forks 12, will be delivered at the proper delivery position, and during transport will not sustain any damages when swinging out and getting entangled. It will be clear to anyone skilled in the art that the opening of the forks precedes the outward movement of the arm and the rotation of the fork.

Unlike FIG. 1, FIG. 2 does not indicate that in the case of several delivery stations the curve plate does not need to be followed, a choice being allowed by a mechanical switch, viz. in FIG. 1 the first switch 4, operated and controlled with the above-mentioned selection signals. Such a switch is shown and described with reference to FIG. 3, and can be used both for a curve plate 5 and for a curve plate 45.

In FIG. 3 an isometric view is shown of a part of the apparatus according to the invention during take-over of the flowers at a supply means 2 as shown in FIG. 1.

For a conveyor 1, again a part of the endless chain 10 is shown, with arm-fork units 11 at fixed intermediate distances on blocks or plates connected with the conveyor, each with main arm 18 and curve follower 13, the conveyor moving the whole along the transport path in the direction of arrow P.

In this figure, it is indicated in detail how the forks, when passing a supply means, and in particular a presenting element 40, i.e. a fork here, take over a flower 9 at a takeover position from the fork 40 and carry it further along to deliver it further on in accordance with the selection signals.

To take over the flower at that position, the arm-fork unit, while circulating along with the conveyor, must be brought into the correct position. This takeover position only needs to be assumed if a monitoring element, for instance a photocell unit, indicates that fork 40 does in fact contain a flower to be taken over. In that case, a second switch 7 is excited by a signal coming from the monitoring element, whereby the unit will proceed to follow a second curve plate 8 to end up in that position.

This second curve plate 8 again has a butting edge 80, and a few sectors, 81–83. There is again a transport sector 81 which the guide roller meets at some point again. If the second switch 7 is set in the takeover direction, for instance a rotary switch which is for instance electromagnetically energized, such a unit will follow a supply sector 82 which, in this exemplary embodiment, widens slightly from the first section 82' to end section 82". Along this sector, the arm 18 is extended again and the fork 12 is rotated. The widening from 82' to 82" offers the advantage that the flower will be gradually carried along from the fork 40 which is at an angle, so that damage can be avoided. In FIG. 3 it is also indicated how fork 40 has a direction, horizontal, obliquely away from the conveyor, and in the direction of transport, to thereby provide a suitable cooperation between the flower to be taken out and the fork 12 still rotating outwards to some extent. After sector 82 follows a return sector 83, where the arm slides back and the fork rotates away again.

Like FIG. 2, FIG. 3 also shows the clamping elements 41 carried along by the second chain 43, and now represents a first curve plate 44, a butting edge 70, and sectors 70, 71, 72, 73, and 75. Contrary to FIG. 2, the sector located farthest from the conveyor is now receiving sector 73. The operation of the pins is the same as that on the delivery side of the apparatus. Also, opening of the pins and outward movement of the arm will be suitably synchronized again.

In FIG. 4, there is shown in detail an isometric view of an arm-fork unit 11. Main arm 18 comprises, at its end remote from the conveyor, means for rotating the fork 12 with fork pins 14. The rotary end of the fork 12 is, for instance, a disc 15 with shaft 16, fitting in a shaft hole 20 of the main arm. Provided on the disc 15 is an end projection pin 17 which after a certain extent of rotation through a rotation end angle around a ring end 19 of the main arm 18 butts against the other side of the main arm 18 and thus, at least in this exemplary embodiment, reaches the straight position, that is, in line with the main arm 18. As desired, pin 17 can be adjusted to thereby obtain a different rotation end angle. In the transport position a transport projection pin 21 butts against one side of the main arm 18. It will be clear to anyone skilled in the art that the rotation can be limited in ways other than with projection pins. As indicated in the figure, the rotation is effected against the direction of movement and the angle of rotation from the retracted position as far as the straight position is at most about −180°.

Main arm 18 can be moved away from the conveyor 1, for instance by sliding in a sliding block 22 which is fixedly connected with the conveyor 1, for instance by means of a plate or a block (not shown in the figures). As elucidated above, such outward movement is effected via curve plates against which curve follower 13 butts. This curve follower is, for instance, a small wheel of a suitable material to prevent wear as much as possible.

The rotation is effected by a belt transmission. In FIG. 4 it is shown how a drive belt 23 is connected to the main arm 18 on one side thereof via a draw spring 26, then passes around the disc 15, and on the other side of the main arm is guided over a guide roller 24, which is fixedly connected with the sliding block 22, to a slide bearing 27 fitted on a vertical rod 25, which is fixedly connected with and points downwards from the proximal end, that is, the end proximal to the conveyor 1, of the main arm. Situated between the slide bearing 27 and the main arm is a compression spring 28 which is much stiffer than the draw spring 26.

Upon outward movement of the main arm 18, the belt will be pulled against the spring force of the draw spring 26, so that the center of rotation of the guide roller is displaced in the direction of the rod because this rod, along with the main arm, is moved thereto. It will be clear to anyone skilled in the art that as a result the length of the belt portion on the other side of the main arm becomes longer and thereby causes the disc 15 of the fork 12 to rotate along. To that end, the belt and the disc must have an engaging friction. This can depend on the selected materials, but it is also possible for the belt and the disc to be connected with each other at a single point or at several points. In FIG. 4 this is represented with two screw connections 31.

The tensions of the draw spring 26 and of the compression spring 28 are selected such that upon rotation only the draw spring 26 is extended. Such rotation roughly corresponds with the first half of the performing sector 52. Upon reaching the last section of this performing sector, the slide bearing 27 will be pulled up to some extent under an appreciably greater tension than upon the rotation. As soon as subsequently the step sector 54 is reached, the main arm, under this tension, will shoot back to the above-discussed parking sector while the fork 12 is not rotated.

Upon reaching the most extended position, the main arm will be locked with the catch device indicated in the figure, consisting of a projection 29 on the main arm and a catch 30 fixedly connected with the above-mentioned block, or also the plate, which in turn are fixedly connected with the conveyor 1. Upon reaching the step sector, there are means which will remove this locking by moving the catch 30 in a manner known in the art.

In FIG. 5 a portion of FIG. 3 is to be seen. While view 5A shows that portion on the same scale, 5B represents a smaller portion on an enlarged scale, in particular the presenting element 40. According to this embodiment of the invention, the presenting element 40 comprises a fork with two fork pins 401 and 402. This fork is connected through a shank 405 with a weighing element 404, which in turn is connected via a connecting piece 403 with the frame of the apparatus for transporting and sorting products, such as flowers.

In both views, it is indicated how the end of fork pin 401 is directed, that is, in the direction of arrow P, to thereby enable the product to be suitably carried along from fork 400 with the aid of the fork 12 of the fork-arm unit 11.

For weighing means at such locations in machines, many solutions are known in the art, for instance a variety of types of weighing cells or load cells. In such load cells, a small extent of bending can yield an electric voltage which is a measure for the weight of the product weighed.

It will be clear to one skilled in the art that many other ways of rotating the fork can be used, while separate motors may be arranged to control the rotation as desired, for instance computer-controlled. It will be equally clear that rotations slightly out of the horizontal plane are conceivable. Moreover, it will be possible, in the case of rotations farther out of the horizontal plane, for objects and products as mentioned before, to be kept vertical nonetheless, as a result of which further space can be saved. Small modifications in the examples and basic principles as described above are understood to fall within the scope of the present invention.

What is claimed is:

1. A method for transporting and sorting flowers or other stem-shaped or elongate products along a transport path in a transport direction in a substantially horizontal plane, said method comprising:

taking over a substantially vertically hanging flower from a take-over position using a rotatable fork comprising fork pins, where, in the take-over position, the rotatable fork is positioned with the fork pins in a perpendicular position relative to the transport direction and the fork has been slid away from the conveyor to a distal position relative to the conveyor;

transporting the flowers, along the transport path while the fork is in a transport position, in which the fork has been slid toward the conveyor to a proximal position relative to the conveyor and the fork has been rotated so the fork pins are in a parallel position relative to the transport direction, to an apparatus comprising at least one bunching station, the transporting taking place in the horizontal plane by at least one detector for detecting at least one flower characteristic, whereby detection signals are obtained;

processing the detection signals into corresponding selection signals; and controlling the fork with the selection signals for delivering the flower to a corresponding selected bunching station, whereby the fork in the horizontal plane is brought to a delivery position by moving the fork, during movement along the transport path, to subsequently deliver the flower from the fork to the selected bunching station.

2. The method according to claim 1, wherein during said taking over a substantially vertical hanging flower, the fork is rotated from the parallel position to the perpendicular position.

3. The method according to claim 2, wherein the fork is rotated in a horizontal fork pin plane when the fork is rotated from the parallel position to the perpendicular position.

4. The method according to claim 3, wherein the fork is rotated through an angle of at most 180° relative to the transport direction when the fork is rotated from the parallel position to the perpendicular position.

5. The method according to claim 1, wherein the flowers are embraced by clamping elements between substantially the take-over position and the delivery position.

6. The method according to claim 1, wherein the products, prior to being transported and sorted, are weighed while hanging in a presenting element.

7. An apparatus for transporting and sorting flowers, said apparatus comprising:

a conveyor with arm-fork units which are movable along a transport path in a transport direction in a substantially horizontal plane;

each said arm-fork unit connected to a part of the conveyor and having an arm having a main center line extending substantially perpendicular to said part of the conveyor in a substantially horizontal plane;

each arm having a distal end which is distal from said conveyor part and a proximal end which is proximal to said conveyor part;

each arm-fork unit at the distal end having a rotation element comprising a fork having fork pins extending in a substantial horizontal fork pin plane;

said fork being rotatably connected to the arm to be movable in said horizontal fork pin plane from:
      a parallel position wherein the fork pins extend parallel to said conveyor part and perpendicular to the main center line of the arm to
      a perpendicular position wherein the fork pins extend perpendicular to said conveyor part and parallel to the main center line of the arm;

said arm being slidably connected to said conveyor to be movable in the direction of the main center line from a distal position located distal from said conveyor part to a proximal position located proximal to said conveyor part, with the flowers hanging substantially vertically in said forks;

detection elements for detecting at least one flower characteristic during the transport of the flowers to an apparatus comprising at least one bunching station, whereby detection signals are obtained;

a processing unit for processing the detection signals into corresponding selection signals; and control elements for bringing, in response to the selection signals, the arm-fork units from a transport position, in which the arm is in the proximal position and the fork is in the parallel position, into a delivery position for delivering the flower at a delivery position to a corresponding selected bunching station, where in the delivery position, the arm is in the distal position and the fork is in the perpendicular position.

8. The apparatus according to claim 7, wherein said rotation element rotates said fork pins from the parallel position to the perpendicular position in said horizontal fork pin plane against a restraining force.

9. The apparatus according to claim 8, wherein the rotation element comprises:

said fork with a shaft-hole assembly;

a rotation limiting system for limiting the rotation of said fork as far as a rotation end angle;

a non-elastic drive belt, while the arm of said arm-fork unit is mounted so as to be slidable on a sliding block mounted on the conveyor and moving along therewith, the arm-fork unit having a vertical downwardly directed rod in the proximal end of the arm and a guide roller on the sliding block on one side of the arm-fork unit, while the drive belt is connected by one end thereof with a lower end of the rod and extends over the guide roller and then under engaging friction around the shaft of the shaft-hole assembly on another side of the arm-fork unit to the proximal end of the arm and is elastically connected therewith.

10. The apparatus according to claim 9, wherein the drive belt is connected with a draw spring to the proximal end of the arm.

11. The apparatus according to claim 7, wherein the control elements comprise a curve plate, fixedly arranged along the conveyor, and a curve follower disposed on said arm, said curve follower follows the curve plate, and gradually moves the arm from its proximal position to its distal position as soon as the curve follower butts against the curve plate upon advancement of the conveyor along the transport path.

12. The apparatus according to claim 11, wherein the drive belt is connected with the lower end of the rod by means of a slide bearing, while a compression spring extends between the slide bearing and the arm, while the compression spring is only compressed after the fork has reached the rotation end angle and while the arm is moved towards the distal position, and the compression spring relaxes upon sliding back of the arm following a step-shaped recess in the curve plate to a parking position in which the fork is in the perpendicular position and the arm is in an intermediate position between the distal and the proximal position, whereafter the arm is gradually returned along a return sector to the proximal position and the fork is returned to the parallel position.

13. The apparatus according to claim 12, further comprising:

a monitoring element for monitoring the offer of new flowers to be taken over by the arm-fork unit, collected in a presenting element, and a second curve plate for bringing the arm-fork unit into a take-over position in response to a signal delivered by the monitoring element, while the flowers in a take-over position are taken over by the arm-fork unit from the presenting element.

14. The apparatus according to claim 13, wherein the presenting element is connected with a weighing element with which each product is weighed prior to transportation and sorting.

15. The apparatus according to claim 13, wherein the presenting element is a fork-shaped element.

16. The apparatus according to claim 7, wherein the arm-fork units have a projection to lock the units with a catch, connected with the conveyor, in the delivery position.

17. The apparatus according to claim 7, wherein the apparatus further comprises clamping elements for embracing the flowers to be transported, between substantially the take-over position and the delivery position.

18. The apparatus according to claim 17, wherein the clamping elements comprise two hinging fork pins.

19. The apparatus according to claim 18, wherein the fork pins are mounted in curve follower blocks for following a first clamping curve plate after taking over the flower and a second clamping curve plate after delivering the flower.

* * * * *